United States Patent
Sauvage

Patent Number: 5,436,856
Date of Patent: Jul. 25, 1995

[54] SELF TESTING COMPUTER SYSTEM WITH CIRCUITS INCLUDING TEST REGISTERS

[75] Inventor: Pierre Sauvage, Champ Sur Drac, France

[73] Assignee: Hewlett-Packard Company, Palo Alto, Calif.

[21] Appl. No.: 151,683

[22] Filed: Nov. 15, 1993

Related U.S. Application Data

[63] Continuation of Ser. No. 872,756, Apr. 23, 1992, abandoned.

[30] Foreign Application Priority Data

Apr. 24, 1991 [FR] France .................. 91 05430

[51] Int. Cl.⁶ .................................. G06F 11/27
[52] U.S. Cl. ........................ 364/580; 364/579; 371/24; 371/25.1; 371/22.5; 371/22.6
[58] Field of Search ............ 371/21.2, 24, 25.1, 371/22.1, 22.5, 22.6, 20.1; 364/579, 580

[56] References Cited

U.S. PATENT DOCUMENTS

| | | | |
|---|---|---|---|
| 4,012,625 | 3/1977 | Bowens et al. | 324/73 R |
| 4,471,484 | 9/1984 | Sedmak | 371/24 |
| 4,563,736 | 1/1986 | Boudreau et al. | 395/575 |
| 4,625,313 | 11/1986 | Springer | 371/24 |
| 4,667,330 | 5/1987 | Kumagai | 371/21.2 |
| 4,719,626 | 1/1988 | Ogasawara | 371/23 |
| 4,724,380 | 2/1988 | Burrows et al. | 371/24 |
| 4,752,929 | 6/1988 | Kantz et al. | 371/24 |
| 4,926,363 | 5/1990 | Nix | 371/20.1 |
| 4,961,067 | 10/1990 | Suzuki | 371/24 |
| 5,157,782 | 10/1992 | Tuttle et al. | 371/25.1 |

FOREIGN PATENT DOCUMENTS

| | | |
|---|---|---|
| 2290708 | 6/1976 | France . |
| 59105109 | 9/1982 | Japan . |

OTHER PUBLICATIONS

IBM Technical Disclosure Bulletin, vol. 30, No. 9, Feb. 1988, New York, U.S., pp. 187–188, "Shadow Diagnostic Register for Gate Array Circuit Testing".

Tietze et al. Halbleiter-Schaltungstechnik 1985, Springer-Verlas, Berlin, p. 647, line 18–p. 649, line 2.

Primary Examiner—Ellis B. Ramirez
Assistant Examiner—Kyle J. Choi

[57] ABSTRACT

The present invention relates to a testing method for an intermediate circuit between a microprocessor and surrounding circuits comprising a first set of access routes including lines of a data bus (D) and a control bus (C), and a second set of access paths comprising lines (AH) connected to other lines (CS) through a processing circuit (40). This method consists in providing in the intermediate circuit a test register (46) addressable by addresses ignored by the other elements of the circuit; writing test words in the test register through either one of the first and second set of as paths; reading the written words in the test register through the other set of access paths; and checking whether the read words correspond in a predetermined way to the test words.

18 Claims, 4 Drawing Sheets

SELF TESTING COMPUTER SYSTEM WITH CIRCUITS INCLUDING TEST REGISTERS

This application is a continuation of application Ser. No. 07/872,756 filed Apr. 23, 1992, now abandoned

BACKGROUND OF THE INVENTION

The present invention relates to computer systems and in particular to a system for the verification of correct information transfers between certain of the circuits of the system and surrounding circuits.

Figure 1:
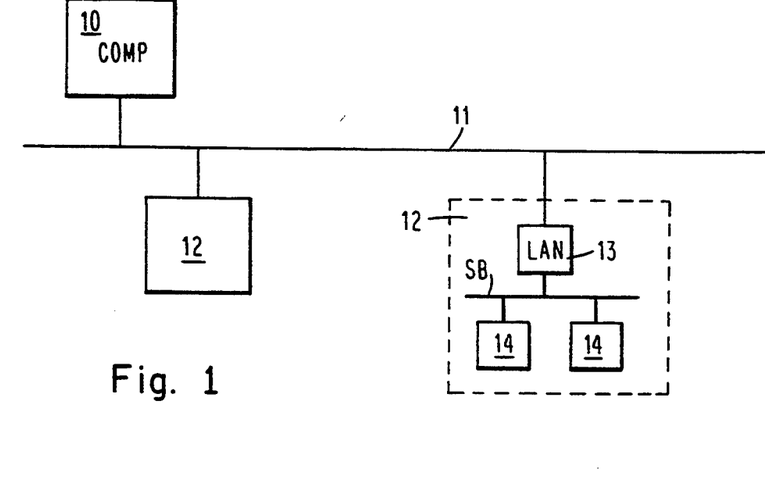
FIGS. 1, 2 and 3, previously described, are respectively diagrams of a conventional network computer system, a computer system board and a circuit of the board.

FIG. 1 is a partial diagram of a conventional computer system. This system comprises a computer 10 associated to a network 11 to which are connected various elements, especially servers 12. A server generally comprises an interface board 13 between the network 11 and a system bus SB to which are connected input/output boards 14. The input/output boards 14 are, for example, connected to terminals, to a telephone network and/or to peripheral devices.

All of the boards of the server 12 are generally managed by the interface board 13. Each of the server boards comprises a microprocessor managing the board itself and allowing it to achieve various operations, especially testing itself and communicating the test results to the computer system.

Figure 2:
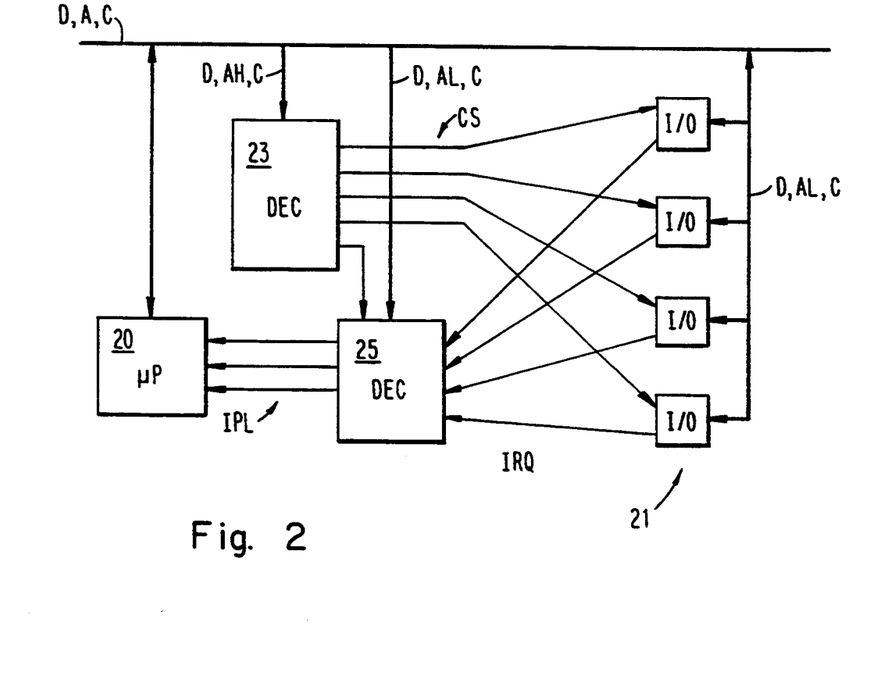

FIG. 2 is a simplified schematic diagram of a board 14 which is here an input/output board. This board comprises a microprocessor 20 connected to a system bus D,A,C internal to the board, comprising a data bus D, an address bus A and a control bus C. The data bus comprises, for example, 16 lines for transmitting 16 bit words. The address bus comprises, for example, 24 lines for communicating 24 bit addresses. The control bus comprises at least three lines which are a clock line (CK), a read/write line (R/W), and a data reception acknowledgement line (DTACK). In the following description, it will only be referred to line R/W, the functions of the other lines not being necessary for understanding the invention. Line R/W allows, as will be seen later, the microprocessor to establish a reading mode (R) or a writing mode (W).

Peripheral devices, not shown, are connected to input/output (I/O) circuits 21. Each I/O circuit can manage a plurality of peripheral devices, for example 8. Each I/O circuit comprises an input connected to a chip-select line CS and an output connected to an interrupt request line IRQ. The CS lines are connected to outputs of an address decoder circuit 23 connected to a plurality of the address bus lines, corresponding to high address lines AH. The IRQ lines are connected to inputs of an interrupt priority level decoder circuit 25 which provides the microprocessor 20 with a binary coded priority level through lines IPL, for example three lines.

For normal operation, circuit 23 is only connected to the address bus and circuit 25 is not connected to any bus. But, generally the decoding functions of decoder circuits 23 and 25 are programmable. Therefore, the address decoder circuit 23 is also connected to the data bus and the decoder circuit 25 is connected to low address lines AL, to a chip-select line CS of circuit 23 and to the data bus.

Each of the I/O circuits is also connected to a certain number of the data bus lines, for example 8, for transmitting 8 bit words between the board and the peripheral device, and to low address lines AL.

Figure 3:
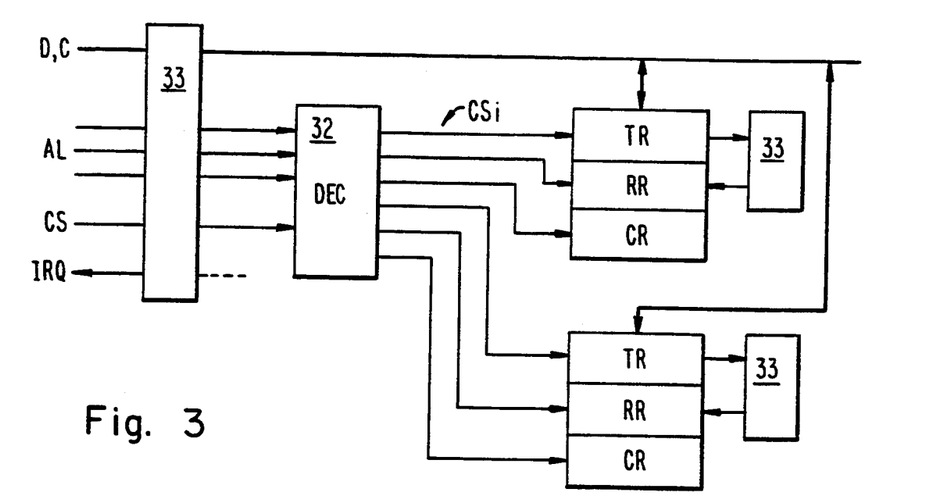

FIG. 3 is a partial diagram of internal circuitry of an input/output circuit 21. This input/output circuit is intended to communicate with two non-represented peripheral devices. Three registers are associated with each peripheral device, namely a data transmission register TR, a data reception register RR and a control register CR. Each of the registers is also connected to the control bus C, to the data bus D and to an internal chip-select line CSi allowing an internal address decoder 32 to select the register. Address decoder 32 is connected to the CS line of circuit 21 and to at least three low address lines in order to be able to select the six registers. All the inputs and outputs of the circuit are buffered by buffers 33.

Words to be transmitted to the peripheral device are written into register TR; the peripheral device writes words which are to be transferred to the data bus in register RR; and in register CR, is written control information which determines a communication protocol, i.e. how data must be communicated with the peripheral device, such as the communication speed, the number of bits per words, the parity of the words. Registers CR are connected to internal circuitry (not shown) which exploit the data of these registers for managing the communication.

In order to read or write in one of the registers of circuit 21, the following operations are performed:

setting by the microprocessor the R/W line of the control bus to a logic state, for example "1" to read and "0" to write;

issuing by the microprocessor an address on the address bus for selecting the desired register;

decoding the high address AH by the decoder circuit 23 which accordingly selects a circuit 21 by setting the associated CS line to an active state, for example "0";

decoding the low address AL by decoder 32 of the selected circuit 21, this decoder selecting the desired register through the associated chip-select line CSi, causing the selected register to write its contents on the data bus if the R/W line is at "0", or to read a word supplied by the microprocessor to the data bus if the R/W line is at "1".

When a peripheral device wishes to communicate with the system, the associated circuit 21 forces its output IRQ to an active state, for example "0", which corresponds to an interruption request. The circuitry establishing this interruption request is not described. Decoder circuit 25 converts this request into a priority level IPL as a function of the priority attributed to the concerned circuit 21. According to the priority level, the microprocessor does or does not interrupt operations of the concerned circuit 21. When the microprocessor interrupts operation, the microprocessor searches for the circuit 21 which requested the interruption by sequentially selecting in read mode (line R/W at "1") the registers RR of circuits 21. The register RR of circuit 21 which requested the interruption writes its contents on the data bus when it is selected and output IRQ of the concerned circuit 21 is then reinitialized.

Common failures of a board are due to bad access paths between various circuits of a board. An access path is defined as comprising a conductive track on the board, the soldered connection of the track to a pin of a circuit, the connection of the pin to a buffer of the circuit chip, the connection of the buffer to metallizations of the chip, and eventually connections through various internal circuits of the chip. Defects in the access paths can result, for example, from poor soldering of the pins to their tracks, from destruction of a buffer and/or from poor chip silicon quality.

In order to detect some of these defects, the microprocessor periodically executes, for example during power-on, a board test program. One of the tests involves verifying the communication between the board and peripheral devices. Therefore, communications between the microprocessor and the input/output circuits are generally tested. If this test is successful and if the peripheral device misfunctions, the defect is localized to the communication between the input/output circuit and this peripheral device, or in the peripheral device.

A conventional test involves checking the connection of the input/output circuit to the data bus, this connection being a common failure source. Register RR is generally read-only, i.e. signals cannot be written in to register RR via the data bus. In register CR, some bits are read-only and the writing in the others of inadequate information can result in an undesirable functioning of the peripheral device. Register TR can be read or written from the data bus and it is in the register that test words are written because it happens to be the most convenient. The written words are then read and compared to the test words whereby it can be determined whether the access paths between the register and the data bus are defective.

However, only words corresponding to data which are ignored by the associated peripheral device can be written in register TR because it is undesirable to operate the peripheral device in an uncontrolled manner. Thus, the set of words that can be written in the register is limited and the failure possibilities of all the access paths cannot be exhaustively tested. Moreover, the set of words that can be written in the register depends on the type of peripheral device connected to the register, hence one specific test program per type of peripheral device must be provided.

Testing only the input/output circuits does not always allow a failure to be localized. Indeed, if the test program indicates a failure, this failure can be due to a bad connection to the data bus, and, for example, to a failure of the address decoder circuit not sending a chip-select.

Testing methods for intermediate circuits in order to better localize failures exist. They consist in simulating peripheral device accesses and the actions of the peripheral devices. Therefore, the previously mentioned transmission and reception registers TR, RR, of the input/output circuits are of a special type. They can be put in a test mode during which their connections to the peripheral devices are interrupted and registers TR are connected to the associated registers RR. The words written into register TR are then transferred to associated register RR where they can be read, which allows checking of whether data, even erroneous, effectively reaches register TR and at the same time if this data generates an interrupt request when it reaches register RR.

However, for reliable verification of the intermediate circuits, at least partial correct functioning of the input/output circuits is needed. For example, if all the lines of the data bus arriving at the input/output circuit are interrupted, this circuit also reacts as if it is not selected. In any case, if the input/output circuit does not generate an interrupt request, it will not be known if it is the input/output circuit that is defective or if it is the priority level decoder circuit. Thus, in spite of this test method with special registers TR and RR, in many cases a failure cannot be accurately localized.

SUMMARY OF THE INVENTION

An object of the invention is to test a microprocessor board by accurately localizing eventual failures.

Another object of the invention is to independently test an address decoder circuit.

Another object of the invention is to independently test an interrupt priority level decoder circuit.

In accordance with the present invention a test register is coupled with programmable registers, as well as address and data lines of a microprocessor means. The test register is written in response to output bits on plural chip select lines and is read out in response to signals on the microprocessor data and address output lines. Preferably the test register is written in response to signals on data and address output lines of the microprocessor means. The test register has output bits which are supplied to certain stages of program registers, which are the same as stages having contents defining priority levels associated with interrupt request input lines.

In a preferred embodiment there are M interrupt request input lines and N interrupt priority level output lines. M program registers are provided and the test register is required to include M+N output bits. A controlling means includes a decoder having M inputs and N outputs and is controlled by the contents of the M program registers. A first logic means combines M of the output bits of the test register with binary levels the M interrupt request input lines for deriving M inputs for the decoder. Second logic means combines the remaining N output bits of the test register with the N output bits of the decoder to derive N output bits that are supplied to the N interrupt priority level output lines.

A second test register preferably includes first and second sets of plural bits, wherein the states of the first set of bits are supplied to the interrupt request input lines and the states of the second set of bits are supplied to the interrupt priority level output lines.

The test register is preferably read out to the microprocessor means so an indication of the output bits on the chip select lines, as stored in the test register, is compared with a desired value of the output bits on the chip select lines. The test register includes plural stages, one for each of the chip select lines. Each of the stages includes a chip select input line selectively coupled to one of plural flip-flops, each having an output coupled to a separate tri-state buffer. The flip-flops and buffer are responsive to different logical combinations of a read/write signal derived by the microprocessor means and a chip enable signal selectively derived in response to outputs of the plural program register means.

In a preferred embodiment, plural M chip select output lines and the programmable register means include M program registers, each associated with one chip select line. The controlling means includes a programmable decoder responsive to the address output lines and output signals of the M program registers to derive M output signals for the M chip select output lines.

BRIEF DESCRIPTION OF THE DRAWINGS

The foregoing and other objects, features and advantages of the invention will be described in more detail in the following description of preferred embodiments and by referring to the accompanying drawings among which.

DESCRIPTION OF PREFERRED EMBODIMENTS

The present invention enables a microprocessor board to be tested to localize eventual failures by first individually testing each of the intermediate circuits and then the input/output circuits. In the following description are successively described how the input/output circuits, an address decoder circuit and an interrupt priority level decoder circuit are tested.

Figure 4:
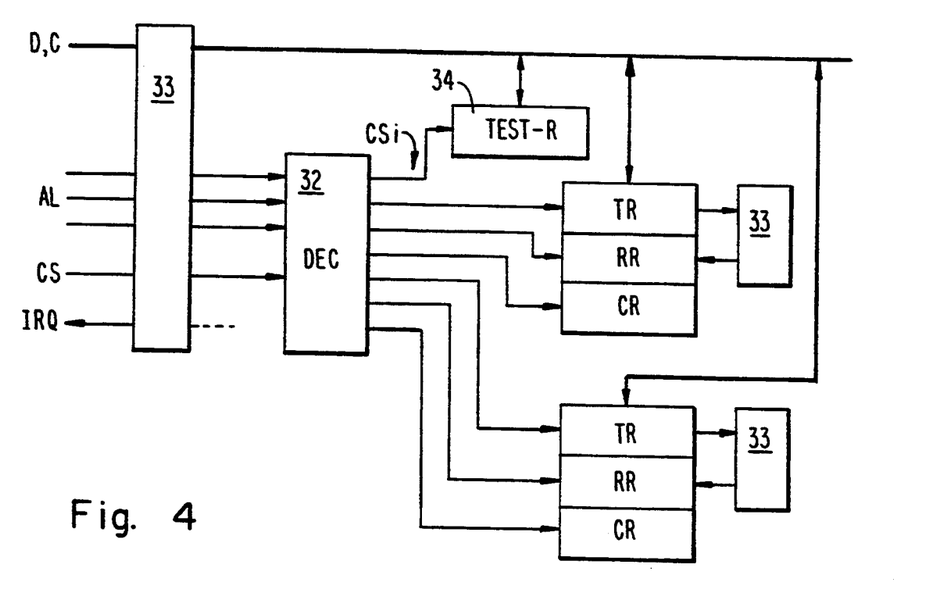
FIG. 4 is a diagram of a preferred embodiment of an input/output circuit of the invention.

An input/output circuit 21 according to the invention, shown in FIG. 4, comprises the same elements as the prior art circuit of FIG. 3 (designated by the same reference numerals) with the inclusion of an additional test register 34 connected to the data bus and to an internal chip-select line CSi. The decoding function of the internal address decoder 32 has been modified in order to be able to select the additional register 34. In the example of FIG. 4, the three low address lines AL provided in the conventional circuit of FIG. 3 are sufficient for also addressing the additional register 34. Indeed, in order to address 6 existing registers, at least three address lines are necessary, which allows eight combinations of which only six were used. Hence, with the additional test register 34, seven combinations are used and it is not necessary to increase the number of address lines reaching the input/output circuit. Generally, in most of the existing input/output circuits, the number of registers that must be addressed is smaller than the possible binary combinations of the address lines reaching the circuit.

During a test phase of the connection of circuit 21 to the data bus D, the apparatus of the invention performs the steps of:
establishing the write mode, selecting register 34 and supplying a test word to data bus D;
establishing the read mode, selecting register 34 and reading the word then present on data bus D.

The test words are written and read through tested access paths comprising the connection of the data bus D to circuit 21, buffer 33 and the connection of buffer 33 to the internal data bus of circuit 21.

If it is supposed that the absence of a signal on the data bus lines is interpreted as a 0 level by the circuits which receive these lines, some of the comparison results can, for example, be interpreted in the following way. If the test word comprises one bit with a "1" value and if this bit has a "0" value in the word that is read, the access path corresponding to this bit is interrupted. If, in the same case, the read word comprises several bits having "1" values, the access paths corresponding to these "1" bits are shorted.

It is also possible to detect inductive couplings between lines of the data bus by trying test words having a significant number of bits having "1" values. Indeed, a significant number of bits having a "1" will, by inductive coupling and during a brief time interval but long enough for erroneous values to be stored in the register, force to "1" the low number of bits normally at "0".

By using test words with a sufficient number of bits at "1", a sufficient decoupling of the power supply lines can also be tested Indeed, when a sufficient number of bits switch from "0" to "1", a current surge is generated due to charging of parasitic capacities. If the supply line supplying this current surge is insufficiently decoupled, its voltage drops abruptly during the surge and the bits which must be set at "1" can remain at "0" during this surge which is generally long enough for erroneous data to be stored in the register.

Figure 5A:
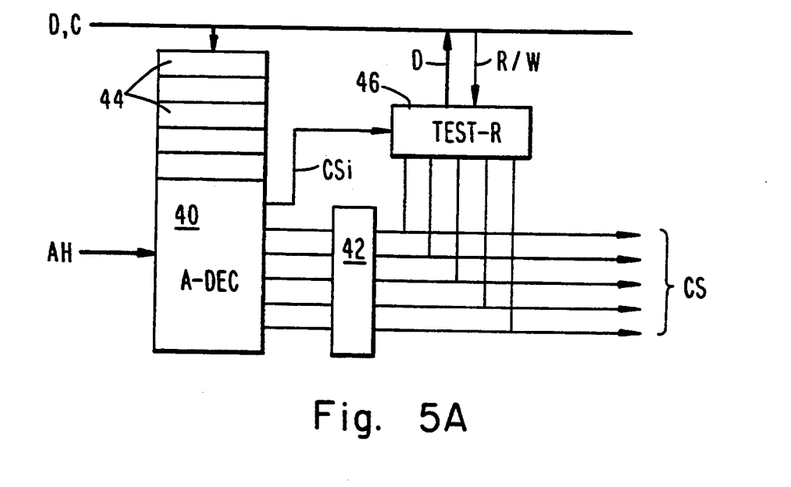
FIGS. 5A and 5B are respectively diagrams of preferred embodiments according to the invention of an address decoder circuit and an associated test register.

FIG. 5A is a diagram of an embodiment of the invention applied to an address decoder circuit 23, such as that shown in FIG. 2. Decoder circuit 23 comprises a programmable decoder 40 responsive to the high address lines AH and feeding the chip-select lines CS through a buffer 42. In order to program the decoding functions, a programmable decoder 40 is connected to one programming register 44 per CS line. Registers 44 are connected to the data and control buses and are selectable by selection lines (not shown) which are controlled by programmable decoder 40. The use and construction of registers 44 are conventional and not described.

According to the invention, decode circuit 23 comprises an additional test register 46 having output bits supplied to the data bus, and an input responsive to the R/W line of the control bus and further inputs responsive to each of the CS lines at the output of buffer 42. Decoder 40 has been modified so it can select additional test register 46 with an additional internal chip-select line CSi. It is not necessary to increase the number of address lines feeding decoder 40 to select the additional test register 46 because this number is relatively large (for example 15) and sufficient to control many more than the existing CS lines.

Figure 5B:
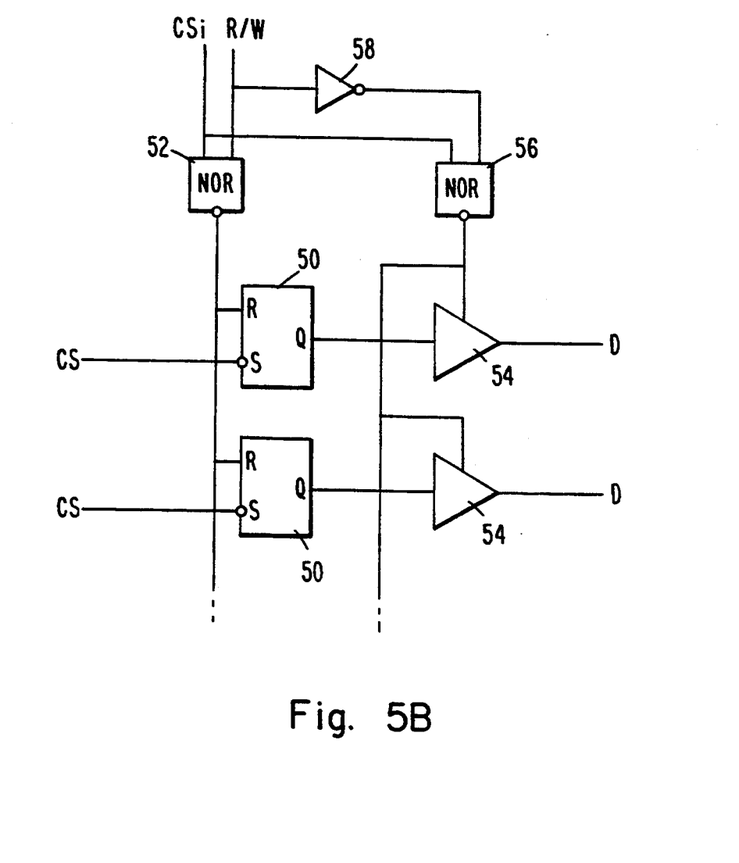

FIG. 5B is a diagram of elements of test register 46, FIG. 5A, associated with two CS lines at the output of buffer 42. Each CS line is connected to a set input S of an RS flip-flop 50. Set input S is active low, i.e. the active state "0" of line CS sets flip-flop 50 to The reset inputs R of all flip-flops 50 are connected to the output of NOR gate 52, the inputs of which are connected the R/W line and the internal chip-select line CSi. Output Q of each flip-flop 50 is connected to a respective line of the data bus D through a tri-state buffer 54° All tri-state buffers 54 are controlled by a NOR gate 56, having a first input connected to line CSi and a second input connected to line R/W through inverter 58. Thus, in write mode (R/W at "0") while register 46 is selected (CSi at "0"), flip-flops 50 are reset. In read mode (R/W at "1") while register 46 is selected, tri-state buffers 54 are active and the contents of flip-flops 50 are transferred to the data bus. The steps of this test phase are the following:

During a test phase, the operation of decoder 40 and buffer 42 are checked in particular. The steps of this test phase are:
establish the write mode and present on the address bus an address selecting register 46, whereby flip-flops 50 are reset;

issue an address to activate (setting to 0) a CS line, whereby a "1" is written in the corresponding flip-flop 50;

establish the read mode and issue an address to again select register 46, whereby the contents of flip-flops 50 are transferred to the data bus; and compare the word then present on the data bus to an expected word.

During its normal operation, decoder 40 can only activate one CS line at a time. During the test phase, the functions of decoder 40 are reprogrammed so that all the possible combinations of the states of the CS lines can be tried. Thus, it is possible to deduce from the test results the failures that have previously been described for the input/output circuit tests.

During the test phase, while the CS lines are activated, data are preferably not supplied to the data bus in order to avoid actions of peripheral devices. Therefore, the R/W line is set to "1" (read mode).

To enhance this test, an additional register can be added to test the connection to the data bus as it is done for the input/output circuits.

Thus, an address decoder circuit can be individually tested and many failures localized in this circuit can be detected.

Connections of the CS outputs to the surrounding circuits are not specifically tested. However, by carrying out the above test phase, defects in these connections or peripheral devices associated with these connections are determined by detecting if the associated peripheral devices do not respond to an activation.

Figure 6:
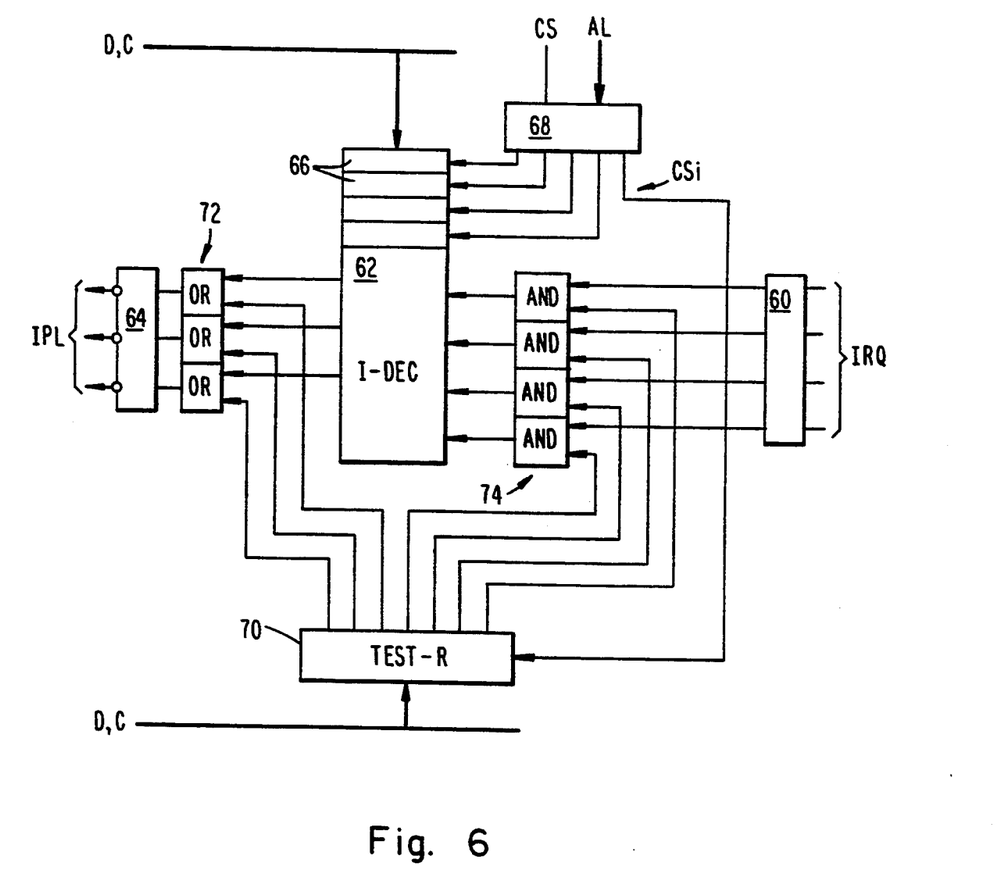
FIG. 6 is a diagram of an embodiment according to the invention of an interrupt priority level decoder circuit.

FIG. 6 is a diagram of an embodiment of the invention applied to an interrupt priority level decoder circuit 25 of the type illustrated in FIG. 2. Circuit 25 comprises interrupt request lines IRQ connected to input buffer 60, having outputs selectively coupled to a programmable decoder 62 via AND gates 74. The outputs of decoder 62 are coupled via OR gates 72 to an output inverting buffer 64 which supplies to previously mentioned output lines IPL a multibit interrupt priority level coded in inverted binary; in the example of FIG. 6 there are three IPL lines coded with priority levels between 0 and 7.

Programmable decoder 62 is programmed in response to signals in programming registers 66, one of which is provided for each IRQ line. Registers 66 also respond to signals from the data and control buses. Address decoder 68 responds to previously mentioned low address lines AL and to chip select CS line of circuit 25 to enable each of the registers 66 through internal chip-select lines CSi. The use of these registers is conventional and is not described.

According to the invention, decoder circuit 25 comprises an additional test register 70 connected to be responsive to data and control buses D, C. Register 70 comprises a first set of latches having outputs feeding the IPL lines at the input of buffer 64 via OR gates 72, and a second set of latches, having outputs feeding the IRQ lines at the output of buffer 60 via AND gates 74. Words written to register 70 are directly, i.e. immediately, coupled to outputs of the register. Address decoder 68 is modified to enable selection of register 70 through an additional internal chip-select line CSi. Address lines AL coupled to the input of decoder 68 are, in most cases, sufficient for selecting the additional register 70. Test register 70 is used during two test phases, a first for testing the connections of lines IPL and a second for testing whether decoder 62 is correctly functioning. It also is convenient during the second test phase to test whether input buffer 60 is correctly functioning. To this end, AND gates, similar to gates 74, are preferably connected to input of buffer 60; however this is not possible with the present technologies.

Assume that, during these test phases, no peripheral device requests an interrupt, i.e. the IRQ lines all stay at "1" and the outputs of decoder 62 all stay at The first test phase involves decoder 62 simulating the provision of priority levels, which is performed as follows. Test words corresponding to priority levels are written in the first set of latches of register 70. These words are simultaneously supplied to the inputs of buffer 64 through OR gates 72. A check is then made as to whether the information now on the IPL lines corresponds to the test word. The check is performed in the same way for all the priority levels. At the end of this first test phase, a "0" is written in the latches of the first set of latches.

The second test phase involves simulating interrupt requests on lines IRQ, which is performed as follows. Test words comprising only one bit at "0" (which corresponds to one interrupt request) are written in the second set of latches of register 70. These test words are simultaneously supplied to lines IRQ through AND-gates 74. A check is made as to whether the information then present at the IPL outputs is effectively a priority level corresponding to the test word. The test continues this way until an interrupt request has been simulated on all IRQ lines. At the end of this second phase, a "1" is written in the latches of the second set of latches.

In the case represented in FIG. 6, there are not enough IRQ lines to simulate all the possible priority levels. Hence, during the second test phase, decoder 62 is reprogrammed through register 66 to supply the missing priority levels to lines IRQ.

Connections to the data bus of decoder circuit 25 can also be tested by providing an additional test register for the input/output circuits.

The connections of lines IRQ to the surrounding circuits are not tested. However, by carrying out the two preceding test phases, defects in these connections are determined by detecting whether or not the computer system does not or does respond when the peripheral devices associated with these connections are used.

The invention can be adapted with minor modifications by adding additional registers to Application Specific Integrated Circuits (ASIC's); the additional registers occupy only a small amount of space and are connected to existing connections.

The invention has been described by referring to the testing of microprocessor boards, but it is also possible to independently test each of the circuits of the board, for example during manufacturing thereof.

Many alternatives and modifications of the present invention will appear to those skilled in the art, especially in what concerns the type and the use of the test registers.

I claim:

1. A testable programmable address decoder for selecting certain circuits comprising plural chip select output lines on which are derived output bits indicative of the selected circuit;

plural address input lines responsive to address bits derived from a microprocessor means;

means responsive to bits on the address lines for controlling bits on the chip select lines;

said controlling means including:

(a) program register means including plural program registers written in response to signals on data and address output lines of the microprocessor means, the program register means responding to the signals on the data and address output lines so the contents of the plural program registers define addresses for which the chip select lines are enabled; and (b) a test register written in response to the output bits on the chip select lines and read out in response to signals on the microprocessor data and address lines.

2. The decoder of claim 1 wherein the program register means and the test register are on a single integrated circuit chip.

3. The decoder of claim 1 wherein the test register is read out to the microprocessor means so an indication of the output bits on chip select lines as stored in the test register can be compared with a desired value of the output bits on the chip select lines.

4. The decoder of claim 1 wherein the test register includes plural stages, one for each of the chip select lines, each of the stages including a chip select input line selectively coupled to a flip-flop, each flip-flop having an output coupled to a separate tri-state buffer, the flip-flop and buffers being responsive to different logical combinations of a read/write signal derived by the microprocessor means, the chip select signal being selectively derived in response to outputs of the plural program register means.

5. A testable programmable interrupt priority level decoder for deriving a multi-bit interrupt priority level comprising:

plural interrupt request input lines;

plural interrupt priority level output lines for supplying a microprocessor means with a multi-bit signal indicative of a priority level associated with the plural interrupt request input lines;

means responsive to bits on the plural interrupt request input lines for controlling bits on the plural interrupt priority level output lines;

said controlling means including:

(a) plural program registers written in response to signals on data and address output lines of the microprocessor means, the program registers responding to the signal on the data and address output lines so the contents of certain of the program registers define priority levels associated with the interrupt request input lines; and (b) a test register written in response to signals on data and address output lines of the microprocessor means and having output bits which are supplied to the same program registers as the program registers having contents defining priority levels associated with the interrupt request input lines.

6. The decoder of claim 5 wherein the program and test registers are on a single integrated circuit chip.

7. An auto-testable system comprising:

a microprocessor having data and address output lines;

input/output circuits coupled to and responsive to signals on the data and address output lines and coupled to peripheral devices for control of selection of the peripheral devices;

a testable programmable address decoder for deriving selection signals for the peripheral devices including: plural chip-select output lines for selecting each of said input/output circuits in response to an address derived on said address lines; plural first program registers written in response to signals on the microprocessor data and address output lines so the contents of the first program registers define addresses for which the chip-select lines are enabled; and a first test register read in response to signals on the microprocessor data and address output lines so the contents of the first test register are set by the states of the chip-select lines;

a testable programmable interrupt priority level decoder for deriving a multi-bit interrupt priority level including: plural interrupt priority level output lines for supplying the microprocessor with a priority level indication of an interrupt request derived from an input/output circuit on one of plural interrupt request input lines; plural second program registers written in by the microprocessor through the data and address lines so the contents of the second program registers define the priority levels associated with the interruption request input lines; and a second test register written in response to signals on the microprocessor data and address output lines so the contents of the second test register are supplied to the interrupt request input lines.

8. An auto-testable system as claimed in claim 7, wherein said second test register includes first and second sets of plural bits, the states of the first set of said plural bits being supplied to the interrupt request input lines and the states of the second set of said plural bits being supplied to the interrupt priority level output lines.

9. An auto-testable system as claimed in claim 7, wherein each of said input/output circuits comprises plural registers which are independently read and written into in response to signals on the microprocessor data and address lines, and a test register which is independently read and written into the microprocessor data and address lines.

10. An auto-testable system as claimed in claim 7, wherein the second program and second test registers are on a single integrated circuit chip.

11. An auto-testable system as claimed in claim 7, wherein the first program and first test registers are on a single integrated circuit chip.

12. A self-testing computer system comprising a microprocessor; a first address decoder; an interrupt priority level decoder; and plural input/output devices, having plural peripheral devices respectively associated therewith; address, control and data busses coupled with said microprocessor and first address decoder; the data bus also being coupled with the plural peripheral devices, interrupt priority level decoder and plural input/output devices; a separate chip select line connected to supply a chip select signal from the first address decoder to each of the input/output devices; a separate interrupt request line connected to supply an interrupt request from each of the input/output devices to the interrupt priority level decoder; plural interrupt priority level lines connected to supply interrupt priority levels from the interrupt priority level decoder to the microprocessor; each of the input/output devices including (a) a second address decoder responsive to first bits of the address bus and the chip select signal for the particular input/output device for deriving a signal to select a peripheral device associated with the particular input/output device and a first internal chip select signal and (b) a first test register selectively activated by the internal chip select signal of the particular input/output device and coupled with the data line; the first address decoder including (a) a third address decoder responsive to second bits of the address bus for deriving the chip select signals that are supplied to the input/output devices and for deriving a second internal chip select signal, (b) a second test register activated by the second internal chip select signal to be responsive to the signals on the chip select lines and supplying signals to the data bus, and (c) a programming register for each input/output device selected to be activated to be responsive to a signal on the data bus by a signal in the third address decoder; the interrupt priority level decoder including (a) a programmable decoder having a separate input for each of the interrupt request lines and a separate output for each interrupt priority level, (b) a fourth address decoder activated by a chip select signal from the first address decoder to be responsive to bits of the address bus and deriving a third internal chip select signal and an address signal for controlling selection by the programmable decoder of the input thereof to be responsive to an interrupt request line, and (c) a third test register activated by the third internal chip select signal to be responsive to the data bus for deriving signals for controlling coupling of signals on the interrupt request lines to the inputs of the programmable decoder and for controlling coupling of the interrupt priority level outputs to the microprocessor.

13. A self-testing computer system comprising a microprocessor; a first address decoder; an interrupt priority level decoder; and plural input/output devices, having plural peripheral devices respectively associated therewith; address, control and data busses coupled with said microprocessor and first address decoder; the data bus also being coupled with the plural peripheral devices, interrupt priority level decoder and plural input/output devices; a separate chip select line connected to supply a chip select signal from the first address decoder to each of the input/output devices; a separate interrupt request line connected to supply an interrupt request from each of the input/output devices to the interrupt priority level decoder; plural interrupt priority level lines connected to supply interrupt priority levels from the interrupt priority level decoder to the microprocessor; each of the input/output devices including (a) a second address decoder responsive to first bits of the address bus and the chip select signal for the particular input/output device for deriving a signal to select a peripheral device associated with the particular input/output device and a first internal chip select signal and (b) a first test register selectively activated by the internal chip select signal of the particular input/output device and coupled with the data line.

14. The self-testing computer system of claim 13 wherein the first address decoder includes: (a) a third address decoder responsive to second bits of the address bus for deriving the chip select signals that are supplied to the input/output devices and for deriving a second internal chip select signal and (b) a second test register activated by the second internal chip select signal to be responsive to the signals on the chip select lines and supplying signals to the data bus, and (c) a programming register for each input/output device selected to be activated to be responsive to a signal on the data bus by a signal in the third address decoder.

15. The self-testing computer system of claim 13 wherein the interrupt priority level decoder includes:
(a) a programmable decoder having a separate input for each of the interrupt request lines and a separate output for each interrupt priority level, (b) a fourth address decoder activated by a chip select signal from the first address decoder to be responsive to bits of the address bus and deriving a third internal chip select signal and an address signal for controlling selection by the programmable decoder of the input thereof to be responsive to an interrupt request line, (c) a third test register activated by the third internal chip select signal to be responsive to the data bus for deriving signals for controlling coupling of signals on the interrupt request lines to the inputs of the programmable decoder and for controlling coupling of the interrupt priority level outputs to the microprocessor.

16. A self-testing computer system comprising a microprocessor; a first address decoder; an interrupt priority level decoder; and plural input/output devices, having plural peripheral devices respectively associated therewith; address, control and data busses coupled with said microprocessor and first address decoder; the data bus also being coupled with the plural peripheral devices, interrupt priority level decoder and plural input/output devices; a separate chip select line connected to supply a chip select signal from the first address decoder to each of the input/output devices; a separate interrupt request line connected to supply an interrupt request from each of the input/output devices to the interrupt priority level decoder; plural interrupt priority level lines connected to supply interrupt priority levels from the interrupt priority level decoder to the microprocessor; the first address decoder including: (a) a third address decoder responsive to second bits of the address bus for deriving the chip select signals that are supplied to the input/output devices and for deriving a second internal chip select signal, (b) a second test register activated by the second internal chip select signal to be responsive to the signals on the chip select lines and supplying signals to the data bus, and (c) a programming register for each input/output device selected to be activated to be responsive to a signal on the data bus by a signal in the third address decoder.

17. The self-testing computer system of claim 16 wherein the interrupt priority level decoder includes (a) a programmable decoder having a separate input for each of the interrupt request lines and a separate output for each interrupt priority level, (b) a fourth address decoder activated by a chip select signal from the first decoder to be responsive to bits of the address bus and deriving a third internal chip select signal and an address signal for controlling selection by the programmable decoder of the input thereof to be responsive to an interrupt request line, (c) a third test register activated by the third internal chip select signal to be responsive to the data bus for deriving signals for controlling coupling of signals on the interrupt request lines to the inputs of the programmable decoder and for controlling coupling of the interrupt priority level outputs to the microprocessor.

18. A self-testing computer system comprising a microprocessor; a first address decoder; an interrupt priority level decoder; and plural input/output devices, having plural peripheral devices associated therewith; address, control and data busses coupled with said microprocessor and first address decoder; the data bus also being coupled with the plural peripheral devices, interrupt priority level decoder and plural input/output devices; a separate chip select line connected to supply a chip select signal from the first address decoder to each of the input/output devices; a separate interrupt request line connected to supply an interrupt request from each of the input/output devices to the interrupt priority level decoder; plural interrupt priority level lines connected to supply interrupt priority levels from the interrupt priority level decoder to the microprocessor; the interrupt priority level decoder including (a) a programmable decoder having a separate input for each of the interrupt request lines and a separate output for each interrupt priority level, (b) a fourth address decoder activated by a chip select signal from the first decoder to be responsive to bits of the address bus and deriving a third internal chip select signal and an address signal for controlling selection by the programmable decoder of the input thereof to be responsive to an interrupt request line, (c) a third test register activated by the third internal chip select signal to be responsive to the data bus for deriving signals for controlling coupling of signals on the interrupt request lines to the inputs of the programmable decoder and for controlling coupling of the interrupt priority level outputs to the microprocessor.

* * * * *

UNITED STATES PATENT AND TRADEMARK OFFICE
CERTIFICATE OF CORRECTION

PATENT NO. : 5,436,856
DATED : July 25, 1995
INVENTOR(S) : Pierre SAUVAGE

It is certified that error appears in the above-indentified patent and that said Letters Patent is hereby corrected as shown below:

Column 4, delete lines 25-38 and 57-63 in their entirety.
Column 6, line 47, after "to" insert --"1"--.
Column 6, line 52, change "o" to --.--
Column 8, line 8, after "at" insert --"0"--.

Signed and Sealed this

Tenth Day of September, 1996

Attest:

BRUCE LEHMAN

Attesting Officer Commissioner of Patents and Trademarks